United States Patent
Taurand

(10) Patent No.: US 7,755,325 B2
(45) Date of Patent: Jul. 13, 2010

(54) SYSTEM FOR EQUILIBRATING AN ENERGY STORAGE DEVICE

(75) Inventor: Christophe Taurand, Valence (FR)

(73) Assignee: Thales (FR)

( * ) Notice: Subject to any disclaimer, the term of this patent is extended or adjusted under 35 U.S.C. 154(b) by 650 days.

(21) Appl. No.: 10/573,785

(22) PCT Filed: Sep. 27, 2004

(86) PCT No.: PCT/EP2004/052325

§ 371 (c)(1),
(2), (4) Date: Mar. 28, 2006

(87) PCT Pub. No.: WO2005/031942

PCT Pub. Date: Apr. 7, 2005

(65) Prior Publication Data

US 2007/0063670 A1    Mar. 22, 2007

(30) Foreign Application Priority Data

Sep. 29, 2003  (FR) .................................... 03 11359

(51) Int. Cl.
*H02J 7/00* (2006.01)
(52) U.S. Cl. ...................................... 320/116; 320/103
(58) Field of Classification Search ................ 320/118, 320/132, 130, 116, 119, 117, 121, 122, 103
See application file for complete search history.

(56) References Cited

U.S. PATENT DOCUMENTS

| | | | |
|---|---|---|---|
| 5,592,067 A | 1/1997 | Peter et al. | |
| 5,631,534 A | 5/1997 | Lewis | |
| 5,636,108 A | 6/1997 | Taurand | |
| 5,745,351 A | 4/1998 | Taurand | |
| 5,898,291 A * | 4/1999 | Hall | 320/121 |
| 5,998,969 A * | 12/1999 | Tsuji et al. | 320/132 |
| 6,020,717 A * | 2/2000 | Kadouchi et al. | 320/116 |
| 6,046,573 A * | 4/2000 | Wikstrom | 320/118 |
| 6,081,095 A | 6/2000 | Nagata et al. | |
| 6,121,768 A | 9/2000 | Taurand | |
| 6,133,712 A * | 10/2000 | Yeon | 320/145 |
| 6,150,795 A | 11/2000 | Kutkut et al. | |
| 6,249,125 B1 * | 6/2001 | Haddad et al. | 324/426 |
| 6,285,568 B1 | 9/2001 | Taurand | |
| 6,462,558 B1 | 10/2002 | Taurand | |
| 6,473,323 B1 | 10/2002 | Taurand | |
| 6,606,022 B1 | 8/2003 | Taurand | |

(Continued)

OTHER PUBLICATIONS

U.S. Appl. No. 09/857,189, Christophe Taurand, filed Dec. 17, 1999 (Now Abandoned).

*Primary Examiner*—Bao Q Vu
*Assistant Examiner*—Nguyen Tran
(74) *Attorney, Agent, or Firm*—Lowe Hauptman Ham & Berner, LLP

(57) ABSTRACT

In an energy storage device comprising a series network of n storage elements $C_1, \ldots C_n$, able to provide a continuous voltage across its terminals, a system for equilibrating the elements is envisaged comprising a plurality of charge transfer modules $M_{i,j}$, each module $M_{i,j}$ ensuring a bidirectional transfer of charge linear to first order between two storage elements $C_i$ and $C_j$ of the said network. Each energy storage element is connected to p modules, $p \leq n-1$, each of the p modules pairing the said element with another element of the network. The time required for reequilibrating is thus reduced.

5 Claims, 7 Drawing Sheets

U.S. PATENT DOCUMENTS

| | | |
|---|---|---|
| 6,975,097 B2 | 12/2005 | Taurand et al. |
| 6,987,680 B2 | 1/2006 | Vire et al. |
| 7,135,847 B2 | 11/2006 | Taurand |
| 7,239,534 B2 | 7/2007 | Blanc et al. |
| 2002/0190692 A1 | 12/2002 | Marten |
| 2007/0063670 A1 | 3/2007 | Taurand |
| 2008/0116850 A1* | 5/2008 | Konishi et al. .............. 320/118 |

* cited by examiner

|  | $V(C_i)$ | $GM^2$ | $GM^1$ | $GM^0$ | $\Sigma_1$ |
|---|---|---|---|---|---|
| $C_8$ | $V_n$ | 0 | +2 ⌐b | -1 ⌐c | +1 |
| $C_7$ | $V_n$ | 0 | +2 | -1 | +1 |
| $C_6$ | $V_n$ | +4 ⌐a | -2 | -1 | +1 |
| $C_5$ | $V_n + \Delta V$ | -4 | -2 | -1 | -7 |
| $C_4$ | $V_n$ | 0 | 0 | +1 | +1 |
| $C_3$ | $V_n$ | 0 | 0 | +1 | +1 |
| $C_2$ | $V_n$ | 0 | 0 | +1 | +1 |
| $C_1$ | $V_n$ | 0 | 0 | +1 | +1 |

FIG.6a

|  | $V(C_i)$ | $GM^2$ | $GM^1$ | $GM^0$ | $\Sigma_2$ |
|---|---|---|---|---|---|
| $C_8$ | $V_n + \frac{\Delta V}{7}$ | -4/7 | -2/7 | -1/7 | -7/7 |
| $C_7$ | $V_n$ | +4/7 | -2/7 | -1/7 | -1/7 |
| $C_6$ | $V_n$ | 0 | +2/7 | -1/7 | -1/7 |
| $C_5$ | $V_n$ | 0 | +2/7 | -1/7 | -1/7 |
| $C_4$ | $V_n$ | 0 | 0 | +1/7 | -1/7 |
| $C_3$ | $V_n$ | 0 | 0 | +1/7 | -1/7 |
| $C_2$ | $V_n$ | 0 | 0 | +1/7 | -1/7 |
| $C_1$ | $V_n$ | 0 | 0 | +1/7 | -1/7 |

FIG.6b

|  | $V(C_i)$ | $\Sigma_1$ | $\Sigma_2$ | $\Sigma$ |
|---|---|---|---|---|
| $C_8$ | $V_n + \frac{\Delta V}{7}$ | +1 | -7/7 | 0 |
| $C_7$ | $V_n$ | +1 | -1/7 | +6/7 |
| $C_6$ | $V_n$ | +1 | -1/7 | +6/7 |
| $C_5$ | $V_n + \Delta V$ | -7 | -1/7 | -48/7 |
| $C_4$ | $V_n$ | +1 | -1/7 | +6/7 |
| $C_3$ | $V_n$ | +1 | -1/7 | +6/7 |
| $C_2$ | $V_n$ | +1 | -1/7 | +6/7 |
| $C_1$ | $V_n$ | +1 | -1/7 | +6/7 |

FIG.6c

SYSTEM FOR EQUILIBRATING AN ENERGY STORAGE DEVICE

FIELD OF THE INVENTION

The present invention relates to a system for equilibrating an energy storage device, in particular based on rechargeable battery cells, such as electrochemical cells or supercapacitors.

These storage devices are commonly used in the industrial and aeronautical media, as backup energy source, when the supply network is defective, or on startup. It is very important to maintain these devices in a complete state of charge, since they must be operational on demand. This presupposes monitoring of their charge with triggering of their recharging if appropriate, and recharging after usage.

These devices customarily comprise a plurality of identical storage elements connected in series, for example electrochemical cells or supercapacitors. The number of elements depends on the application aimed at: typically 24 volts in the industrial sector, 28 volts in the aeronautical sector and 42 volts in the automotive sector. If we take cells of lithium-ion type (4 volts for a charged cell) and an aeronautical application, an energy storage device thus typically comprises 7 elements. A charger, comprising a power converter supplied by the main network and whose output is regulated in voltage and in current, makes it possible to charge the cells which are connected in series.

The storage elements used are such that the voltage at their terminals is dependent on the state of charge. In a known manner, these storage elements are poor at withstanding overloads and/or overly large discharges. If we take the example of cells of rechargeable lithium-ion battery type, these cells have very beneficial energy-related and mass-related performance, but pose problems for managing their charge in tandem with their utilization. This is a hindrance for applications in which long duration and high reliability are sought. In particular, these cells are very sensitive to overvoltages, thereby requiring monitoring of the voltage at the terminals of each cell. If we take the example of supercapacitors which are capacitors obtained by stacking thin films, and which are characterized by a low voltage (of the order of a volt to a few volts), and a very high value of capacitance, of the order of several farads. The voltage at the terminals of each capacitor may be shifted with respect to that of the others capacitors because of difference of values and or of leakage currents.

Placed in series, the storage elements will not therefore all behave in the same way: they may be in an different initial state of charge; some may have leakage currents; others a different energy storage capacity, either due to natural initial scatter between elements or due to aging. All these differences of behavior manifest themselves by a recharging time and voltages which vary. If the recharging of the storage device is managed by observing the voltage across its terminals, if a cell recharges more quickly than the others, it will overcharge (voltage greater than 4 volts for a lithium cell). Conversely, a cell much slower to recharge will undercharge (voltage below 3.5 volts for a lithium cell). In both cases, these are conditions very unfavorable to the reliability of these cells, and consequently, of the storage device itself. Furthermore, the differences of state of charges which may exist initially will be accentuated with the successive charging/discharging cycles, inducing poor operation of the device, by premature degradation of its performance.

For these various reasons, rigorous management of such an energy storage device so as to improve the reliability thereof may not be based on just the monitoring of the voltage available at the end terminals of the device. Use is thus made of a battery monitoring unit generally referred as BMU, which acts as a protection mechanism. This BMU checks that each of the storage elements does not exceed a critical threshold voltage while charging and/or discharging. Furthermore, it monitors the activation of a system for equilibrating the series elements of the energy storage device. The function of such an equilibrating system is to maintain an identical voltage on all the storage elements. The basic principle of equilibration consists in the monitoring by the BMU of all the voltage differences between the series elements of the storage device, so as to trigger the equilibrating system as soon as at least one of these voltage differences exceeds a certain critical value. For example, if we exceed 60 millivolts between the most charged storage element and the least charged storage element, the equilibrating system is triggered. The equilibrating system will be stopped when the voltage difference reverts to an acceptable value, for example 30 millivolts. The basic principle of re-equilibration is to tap an amount of energy off from the most charged element or elements so as to dissipate it or transfer it to the least charged elements. In aeronautics, such an equilibrating system succeeds in being able to equilibrate the charges both in charging mode and in standby mode awaiting use of the energy reserve, so as to increase the availability thereof.

DISCUSSION OF THE BACKGROUND

A system for equilibrating of the state of the art is represented in FIG. 1. In this example, the energy storage device 1 comprises n=6 storage elements in series, $C_1$ to $C_6$. The voltage equilibrating system consists in envisaging n−1 identical bidirectional charge transfer modules, each charge transfer module $M_{i,i+1}$ being assigned to two energy storage elements $C_i$ and $C_{i+1}$ connected in series: In the example we thus have a module $M_{1,2}$ which pairs the storage elements $C_1$ and $C_2$ so as to perform if appropriate a charge transfer between these two elements.

The charge transfer modules are controlled (com) by the charge management system BMU, when the latter detects an overly large voltage deviation between two storage elements of the series network. When they are activated, each charge transfer module ensures a charge transfer between the two storage elements thus paired, by injecting a current proportional to the voltage difference between the two storage elements into the storage element exhibiting the lowest voltage across its terminals. A charge transfer module $M_{i-1,i}$ associated with the pair of storage elements $C_{i-1}$, $C_i$, can for example be produced by an electronic circuit of three-pole type with charge pump as illustrated in FIG. 2. This circuit comprises three terminals A, B and G. The storage element $C_i$ is connected between the terminals A and G, and the storage element $C_{i-1}$ is connected between the terminals G and B, the point G being thus connected to the connection node between the two adjacent elements $C_i$ and $C_{i-1}$. This three-pole circuit comprises in this exemplary embodiment, a charge capacitor 2 and two pairs of high and low switches (T1, B1) (T2, B2), by which the capacitor is alternately connected in parallel to a storage element, $C_i$, by the terminals A and G, then to the other $C_{i+1}$, by the terminals G and B. The turning on and off of the switches tracks the clock frequency of the command signal com, provided by the BMU. The application of a command signal com of binary type, at the frequency f, causes the alternate switching of the two pairs, the first pair (T1, B1) on the high level ("1") of the signal com and the second pair (T2, B2) on the low level ("0").

A drawback of such an equilibrating system is that the energy excess on a storage element is transfered to the adjacent storage element, and so on and so forth according to a chained mode of transfer, the arrangement of the charge transfer modules corresponding to the series structure of the storage elements.

From the energy standpoint, it is not very good: if the first module ensures energy efficiency of 90%, 10% is lost from module to module.

Furthermore the charge transfer modules are generally dimensioned so as to pass a certain amount of energy corresponding typically to that due to a single unequilibrated element in the network. If two elements are unequilibrated in the network, the module is thus limited by its capacity in current. Hence, the time for equilibrating the series network will be twice as long.

SUMMARY OF THE INVENTION

An aim of the invention is to propose an optimal system for equilibrating n series elements of an energy storage device, this equilibrating system being able to be activated both in charging mode and in use mode of the energy reserve.

This aim is achieved by an equilibrating system comprising h bidirectional charge transfer modules. According to the invention, with each storage element is associated p modules, each module pairing the said storage element with another storage element of the energy storage device.

This results for each of the n storage elements of the energy storage device, in a transfer of charge corresponding to a current proportional to the voltage average on the p associated elements.

The transfer modules are more numerous, but are also smaller, since for each storage element of the network, the charge transfer is distributed by p modules.

The equilibration of the network also converges more rapidly.

Thus the invention relates to an energy storage device comprising a series network of n storage elements able to provide a continuous voltage across its terminals, and a plurality of charge transfer modules, each module ensuring a bidirectional transfer of charge between two storage elements of the said network.

According to the invention, an optimal equilibrating system is obtained by providing with a charge transfer on each of the n elements of the network which is distributed over each of the other n−1 elements of the series network. This is achieved by associating with each of the n storage elements, n−1 transfer modules, each module being associated with one out of the other n−1 storage elements.

Such a system requires n(n−1)/2 charge transfer modules.

The invention thus relates to an energy storage device comprising a series network of n storage elements able to provide a continuous voltage across its terminals, and a plurality of charge transfer modules, each module ensuring a bidirectional transfer of charge between two storage elements of the said network, characterized in that it comprises n(n−1)/2 identical modules, each storage element being paired with each of the other n−1 storage elements of the network by (n−1) associated modules.

According to another aspect of the invention, for the case where $n=2^m$, we envisage advantageously that the device comprises n−1 modules of three-pole type, distributed as m groups of rank 0 to m−1, such that to the group of rank i there corresponds $2^i$ modules, each associated with $n/2^i$ elements arranged as two assemblies so as to form a pair, the modules of the said group of rank I≠0 being dimensioned so as to have a gain in current $2^i$ times as large as the gain in current of the module of the group of rank 0.

According to another aspect of the invention, for the case where $n=2^{m-x}$, characterized in that it comprises a number I of modules of three-pole type, with n−1−x<I≦n−1 modules, distributed as m groups of rank 0 to m−1, such that to the group of rank i there corresponds at most $2^i$ modules, each associated with $n/2^i$ elements arranged as two assemblies so as to form a pair, the modules of the said group of rank I≠0 being dimensioned so as to have a gain in current $2^i$ times as large as the gain in current of the module of the group of rank 0.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention.

Accordingly, the drawings and description thereof are to be regarded as illustrative in nature, and not as restrictive.

BRIEF DESCRIPTION OF THE DRAWINGS

FIGS. 6*a*, 6*b* and 6*c* illustrate the equilibrating phenomenon obtained with an equilibrating system such as represented in FIG. 5.

An equilibrating system according to the invention comprises h charge transfer modules, h≧n−1.

The basic principle of the invention for each storage element of the series network, is to distribute the charge transfer over p elements, p≦n−1.

Let $C_i$ be a storage element. p charge transfer modules are associated with it, each module pairing this element $C_i$ with another storage element of the device. Each module thus ensures a direct transfer of a part of the energy between the element $C_i$ and each of the p elements which are paired with it. The current injected is thus proportional to the voltage difference between the element $C_i$ and the average of the voltages across the terminals of the other p elements.

The charge transfer modules must be dimensioned in number and in gain in current so that ultimately, the energy to be transfered is distributed over all the elements.

Figure 3:
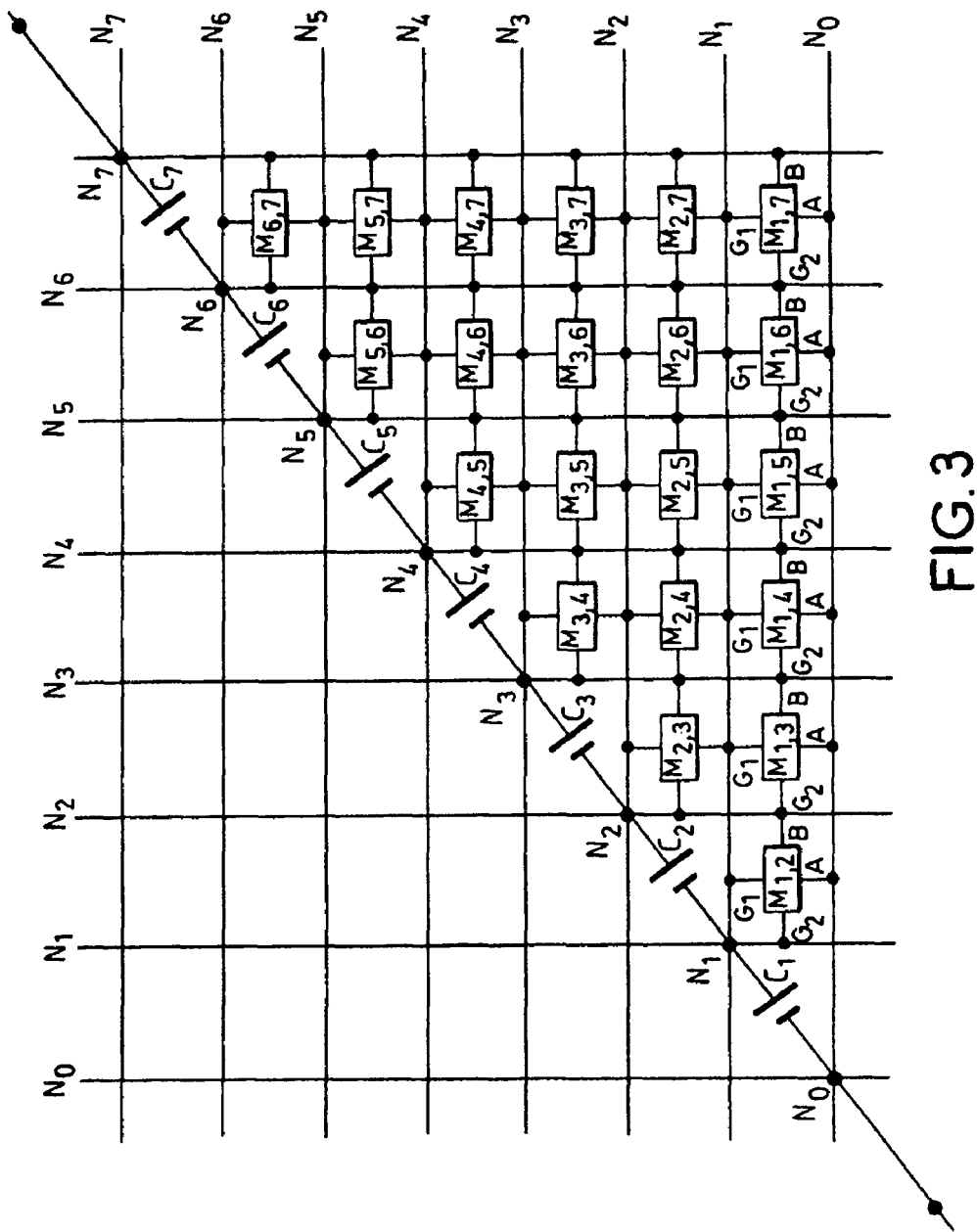
FIG. 3 illustrates a first embodiment of an equilibrating system according to the invention.

A first embodiment of the invention is represented in FIG. 3. In this embodiment, we have p=n−1. The total number of modules is thus equal to n(n−1)/2.

Each storage element $C_i$ is paired with each of the other n−1 elements of the storage device by a specific charge transfer module. This combinatorial arrangement is represented in FIG. 3 by using the representation termed Pascal's triangle. The energy storage elements $C_1$ to $C_7$ are represented on the diagonal. In the Pascal triangle, we find the n(n−1)/2 charge transfer modules which make it possible to link each of the elements of the diagonal to another element of this diagonal.

For example, the element $C_7$ is paired:

with the element $C_6$, by the module $M_{7,6}$;
with the element $C_5$, by the module $M_{7,5}$;
with the element $C_4$, by the module $M_{7,4}$;
with the element $C_3$, by the module $M_{7,3}$;
with the element $C_2$, by the module $M_{7,2}$;
with the element $C_1$, by the module $M_{7,1}$.

Figure 2:
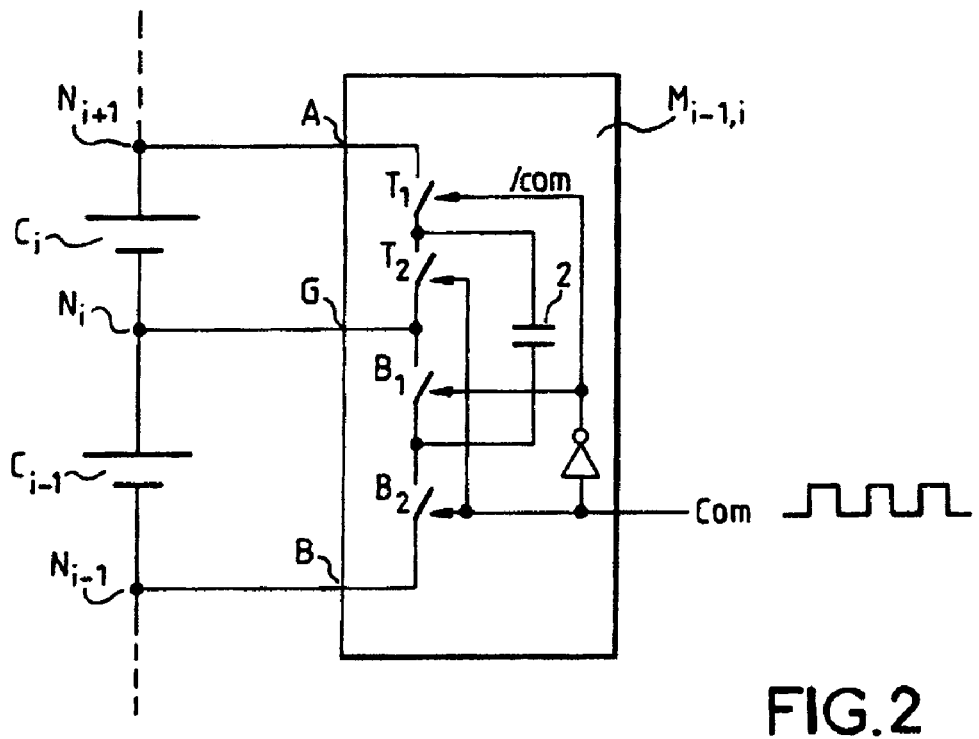
FIG. 2 illustrates an exemplary charge transfer module which can be used in an equilibrating system.
Figure 4:
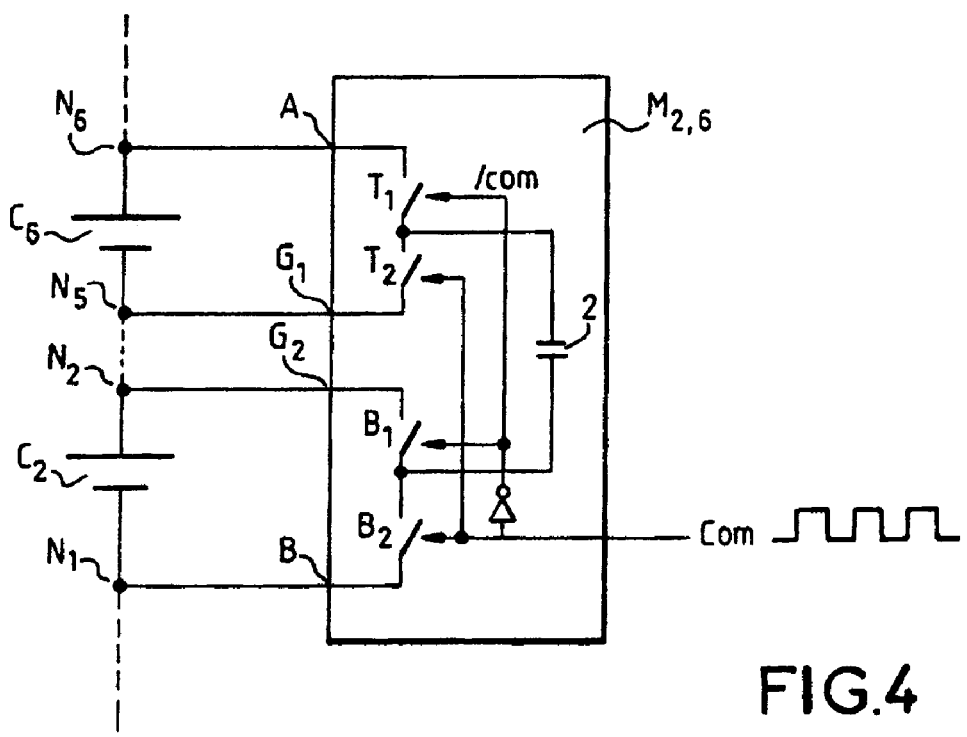
FIG. 4 illustrates an exemplary charge transfer module which can be used in an equilibrating system according to the invention.

This arrangement assumes the use as charge transfer module of the electronic circuits of three-pole type as represented in FIG. 2, for pairing two adjacent elements, and of four-pole type for pairing two remote elements. Such an electronic circuit of four-pole type is represented in FIG. 4, in an example of linear bidirectional charge transfer performed by charge pump by means of a capacitor as in the three-pole example of FIG. 2. This four-pole then has four terminals $ABG_1G_2$, the terminals $G_1, G_2$ being connected to the same point in the case of adjacent elements, this being equivalent to three-poles.

The regulating principle is thus effected for each storage element by direct transfer to each of the other n−1 elements, by means of a current proportional to the voltage difference between this element and the voltage average across the terminals of the other n−1 elements: $I = k \cdot \Delta V$.

If we assume that we an excess of voltage $\Delta V$ on the element $C_4$, the other storage elements all being at the same voltage V, a charge transfer will be performed from the element $C_4$ to the other elements $C_1, C_2, C_3, C_5, C_6$, and $C_7$ so that each of these 6 elements receives a current of $$k\frac{\Delta V}{7}.$$

At the same time, a current of $$k\frac{6 \cdot \Delta V}{7}$$

will be tapped off from the element $C_4$. These injected and tapped off currents will eventually bring about equilibrium in the voltage across the terminals of the various cells. When equilibrium is achieved, each element to a voltage of $$V + \frac{\Delta V}{7}$$

across its terminals.

In practice, the equilibration is effected for all the elements at the same time. The transfer modules are all charged at the same time, once, in parallel. Equilibrium is attained much faster.

Figure 7A:
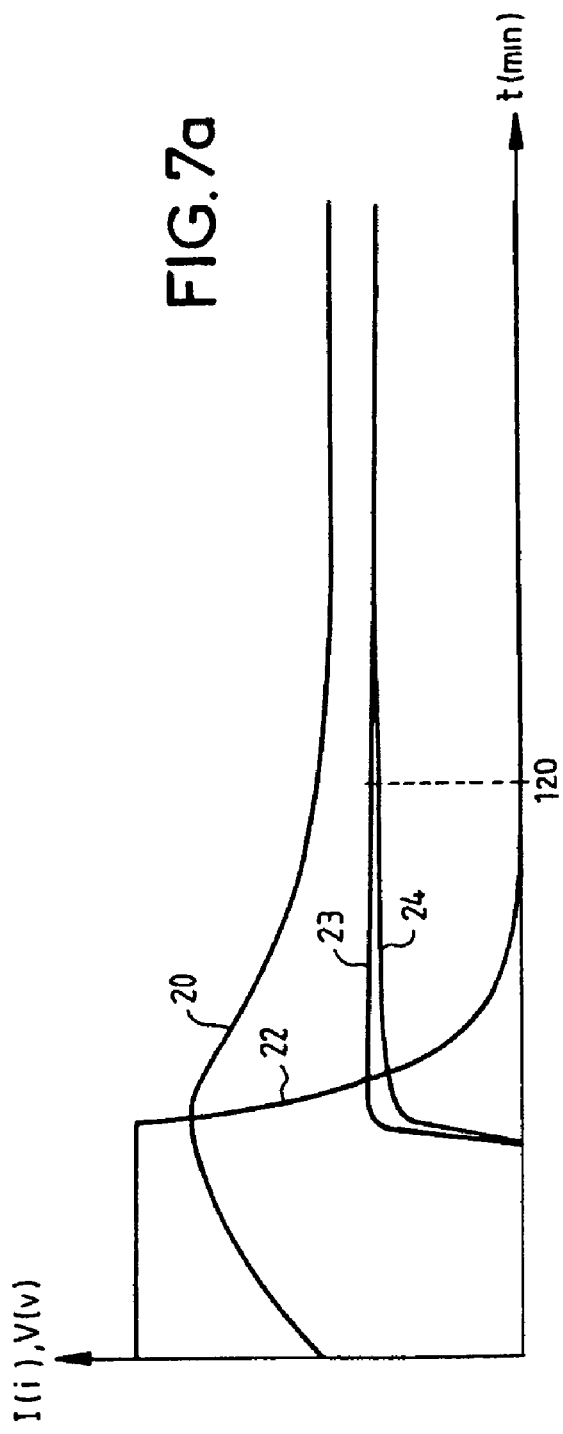
FIGS. 7*a* and 7*b* illustrate the equilibrating time gain obtained with an equilibrating system according to the invention (FIG. 7*a*) with respect to a system according to the state of the art (FIG. 7*b*) and FIG. 8 represents a variant embodiment of the system for reequilibrating of FIG. 5.
Figure 7B:
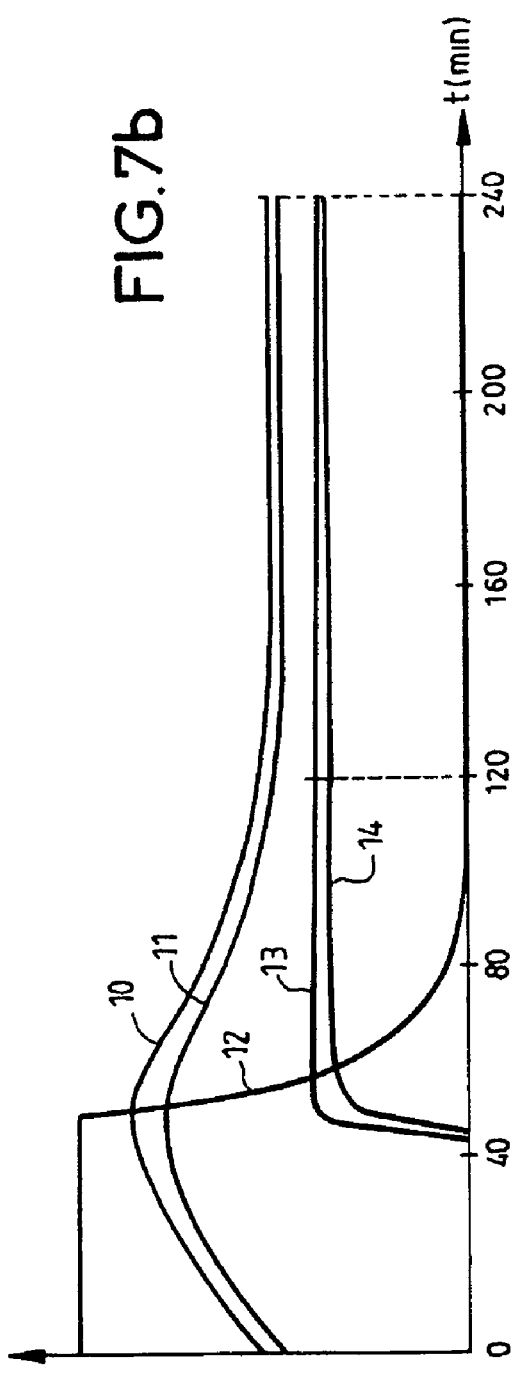

It is this that is illustrated in FIGS. 7a and 7b, for an energy storage device, starting from a zero initial state of charge, having a cell of energy capacity 5% lower than that of the other cells.

Figure 1:
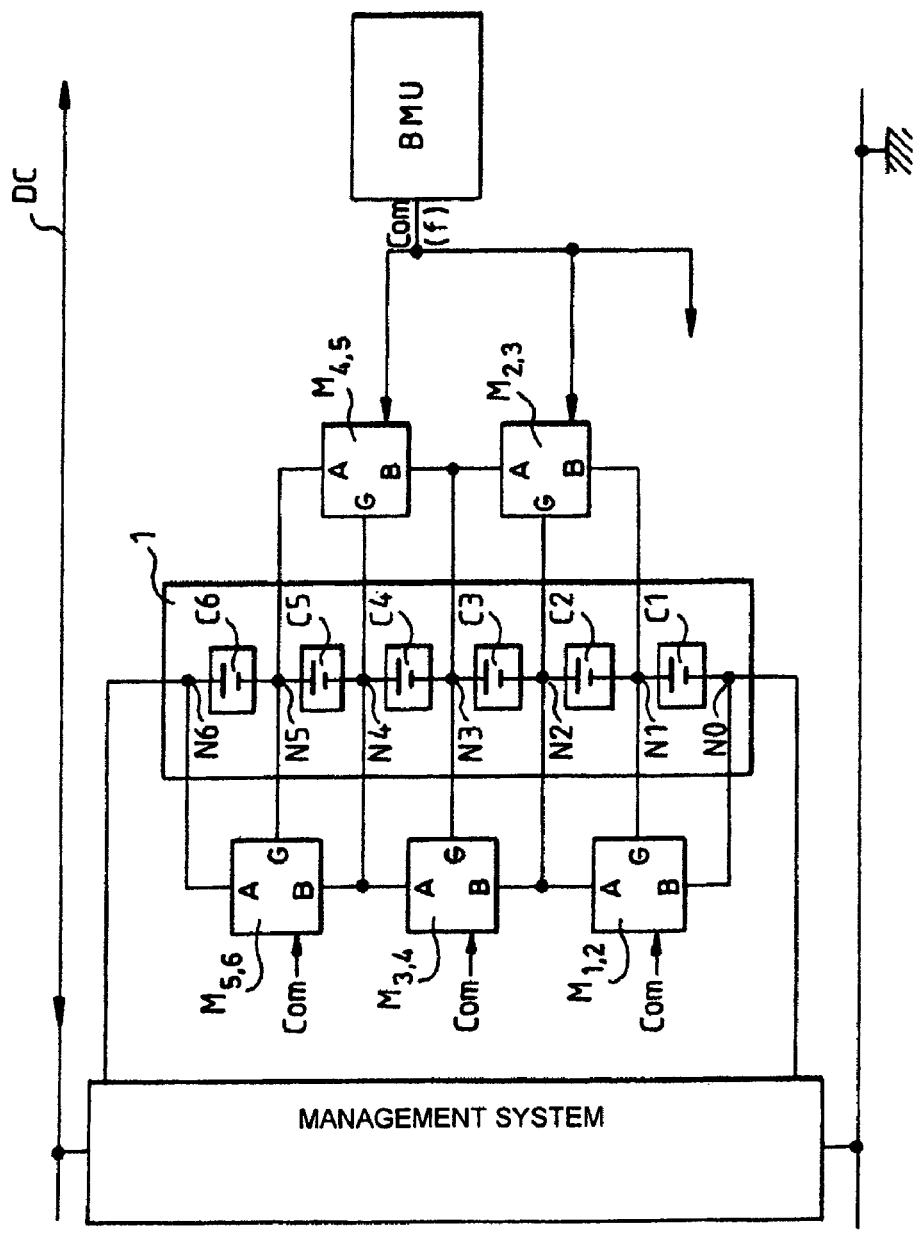
FIG. 1 illustrates an equilibrating system according to the state of the art.

FIG. 7b corresponds to an equilibrating system with chained structure of modules, according to the state of the art (FIGS. 1 and 2). Curves 10 and 11 represent the minimum and maximum values of the compensation current of the normal cells. Curve 12 represents the charging current common to all the cells originating from the battery charger. Seen therein is a regulating phase at constant current followed by an exponential decay of this charging current when the charger passes from regulation in current mode to regulation in voltage mode. Curves 13 and 14 show the evolution envelope of the voltages across the terminals of each cell. Equilibrium is achieved at around t=240 min.

FIG. 7a, shows that an equilibrating system according to the invention makes it possible to achieve equilibrium much more rapidly, at around t=120 min.

In this first exemplary embodiment of a system for equilibrating energy of a device comprising n energy storage elements in series, n(n−1)/2 modules are necessary, all identical, that is to say dimensioned identically so as to pass the same current Imax.

FIGS. 5 and 6a to 6c relate to another embodiment of an equilibrating system according to the invention, by which the number of modules required is reduced to n−1 when n is a power of 2, i.e. $n = 2^m$. The modules are then all of three-pole type ABG.

This reduction is obtained by using the reduction to base two of the number n of storage elements of the series network.

We recall that a transfer module of three-pole type provides a current I proportional to the voltage difference $V_{AG} - V_{GB}$. We denote by k this proportionality factor: $I = k[V_{AG} - V_{GB}]$.

According to the invention, we then have m groups of transfer modules, of rank 0 to m−1. Each group of rank i=0 to m−1 comprises $2^i$ modules. Each module of this group of rank i≠0 is dimensioned so as to have a gain in current $k_i$ $2^i$ times as large as the module of the group of rank 0. Each module is connected in parallel to a group of $n/2^i$ storage elements arranged as two assemblies so as to form a pair.

Figure 5:
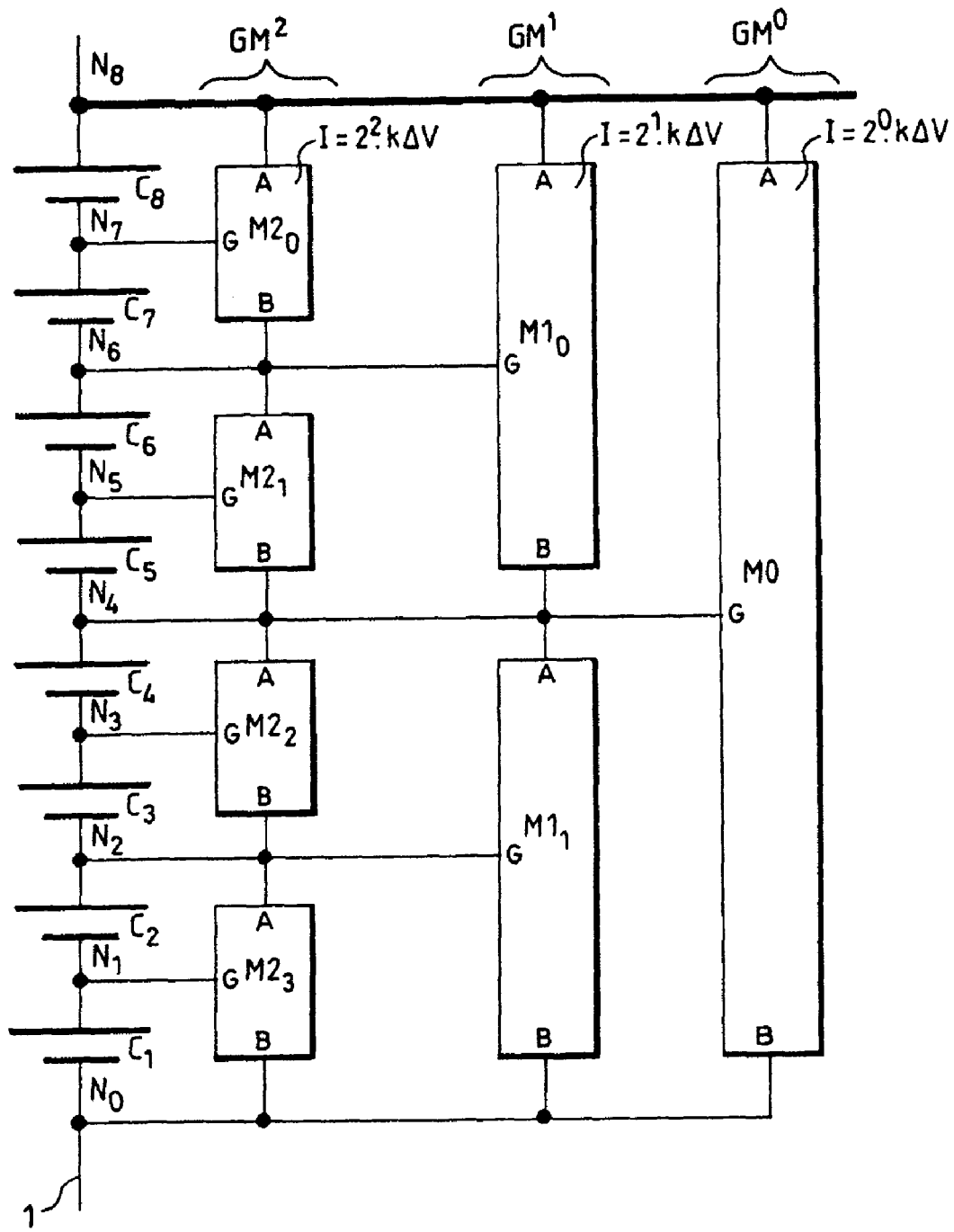
FIG. 5 illustrates another embodiment of a reequilibrating system according to the invention.

More particularly, if we take the example represented in FIG. 5, with $n = 8 = 2^3$ storage elements in series. In this example, we have m=3. We thus have m=3 groups of modules $GM^0$, $GM^1$, $GM^2$ of rank respectively 0, 1 and 2.

The group $GM^0$, of rank 0, comprises $2^0 = 1$ transfer module, denoted M0, connected between the end terminals of the network (in parallel with the n storage elements).

The group of rank 1, comprises $2^1 = 2$ transfer modules, denoted $M1_0$ and $M1_1$. Each module is connected in parallel to $n/2^1 = 4$ series storage elements arranged as two assemblies each of two elements, to form a pair. Each module is dimensioned so as to have a gain in current $2^1$ times as large as the module M0.

We thus have $M1_0$ connected in parallel to $C_5, C_6, C_7, C_8$ with the reference point G of the three-pole connected to the mid-point $N_6$ of this series assembly (between $C_6$ and $C_7$). Likewise, $M1_1$ is connected in parallel to $C_1, C_2, C_3, C_4$, with the reference point G of the three-pole connected to the mid-point $N_2$ of this series assembly (between $C_2$ and $C_3$).

The group of rank 2, comprises $2^2 = 4$ transfer modules, denoted $M2_0$ to $M2_3$. Each module is connected in parallel to $n/2^2 = 2$ series storage elements which form a pair. They have a gain in current $2^2$ as large as the module M0.

For example the module $M2_0$ is connected in parallel to $C_7$ and $C_8$, with the reference point G connected to the mid-point $N_7$ of connection between these two elements. The other modules of this group, respectively $M2_1$, $M2_2$ and $M2_3$ are connected in a similar manner, respectively to $(C_6, C_5)$, $(C_4, C_3)$ and $(C_2, C_1)$.

As in the first embodiment, the transfer modules are all charged at the same time, once, so as to effect the equilibration. Identical performance is obtained. The difference is to do with the reduced number of modules.

An example of charge equilibrating is represented in FIG. 6a, for a storage device in accordance with FIG. 5, with n=8 storage elements, in an example where all the elements have a voltage $V_n$ across their terminals, except one, in the example $C_5$, which has a voltage $V_n+\Delta V$.

The modules of the group $GM^2$ operate in pairs of adjacent elements, represented in the figure by rectangles along the column $GM^2$. For the equilibrated pairs of elements, transfer is zero. For the pair a containing the element $C_5$, the transfer can be written as an amount of negative charge $-Q$ tapped off from the element $C_5$ and an amount of positive charge $+Q$ transfered to the element $C_6$. To mark the gain of four assigned to the modules of this column, we write $+Q=+4$ and $-Q=-4$.

The modules of the group $GM^1$ each operate on four adjacent elements, arranged as two assemblies of two elements to form a pair. Each pair is represented in the figure by a rectangle in column $GM^1$. The pair $\{(C_1, C_2), (C_3, C_4)\}$ is equilibrated, transfer is zero for this assembly. For the pair b $\{(C_5, C_6), (C_7, C_8)\}$ containing the element $C_5$, the transfer can be written as an amount of negative charge $-Q$ tapped off from the series assembly $(C_5, C_6)$ and an amount of positive charge $+Q$ transfered to the series assembly $(C_7, C_8)$. To mark the gain of two assigned to the modules of this column, we write $+Q=+2$ and $-Q=-2$.

The module of the group $GM^0$ operates on the eight adjacent elements, arranged as two assemblies of four elements to form a pair c represented in the figure by a rectangle along column $GM^0$: $\{(C_1, C_2, C_3, C_4), (C_5, C_6, C_7, C_8)\}$. This pair c containing the element $C_5$, the transfer can be written as an amount of negative charge $-Q$ tapped off from the series assembly $(C_5, C_6, C_7, C_8)$ and an amount of positive charge $+Q$ transfered to the series assembly $(C_1, C_2, C_3, C_4)$. To mark that this module serves as reference for the gain in current, which is the same as saying that we allocate a unit gain to MO, we write $+Q=+1$ and $-Q=-1$.

The column $\Sigma 1$ represents the sum of the charges transfered to each element of the network. The amount of charge tapped off from the element $C_5$ is distributed over each of the other elements which therefore receives an amount of charge equal to the amount of charge tapped off divided by the number of elements over which it is distributed.

This transfer is effected by charging all the modules of the equilibrating system at the same time, in parallel, hence a particularly advantageous gain in equilibrating time.

This embodiment of an equilibrating system according to the invention with a reduced number of charge transfer modules has just been described in an exemplary energy storage device containing a number n of elements that is expressed as a power of two: $n=2^m$.

In the case where n is any integer which may be written: $n=2^m-x$, we show that it is possible to construct an equilibrating system of this type, by using x virtual storage elements to build the structure of the system. In practice, we obtain an equilibrating system comprising I modules, with I an integer such that $n-1-x<I\leq n-1$.

If we return to FIG. 5. In the storage elements $C_1$ to $C_8$ represented, we now consider the storage device to comprise only 7 elements, this generally being the case for applications in aeronautics (with lithium-ion cells).

The real number of elements is therefore n=7. We have $2^{m-1} \leq n \leq 2^m$, or else $n=2^m-1$.

We then design the structure by adding 1 virtual cell which is $C_8$ in FIG. 5.

Figure 8:
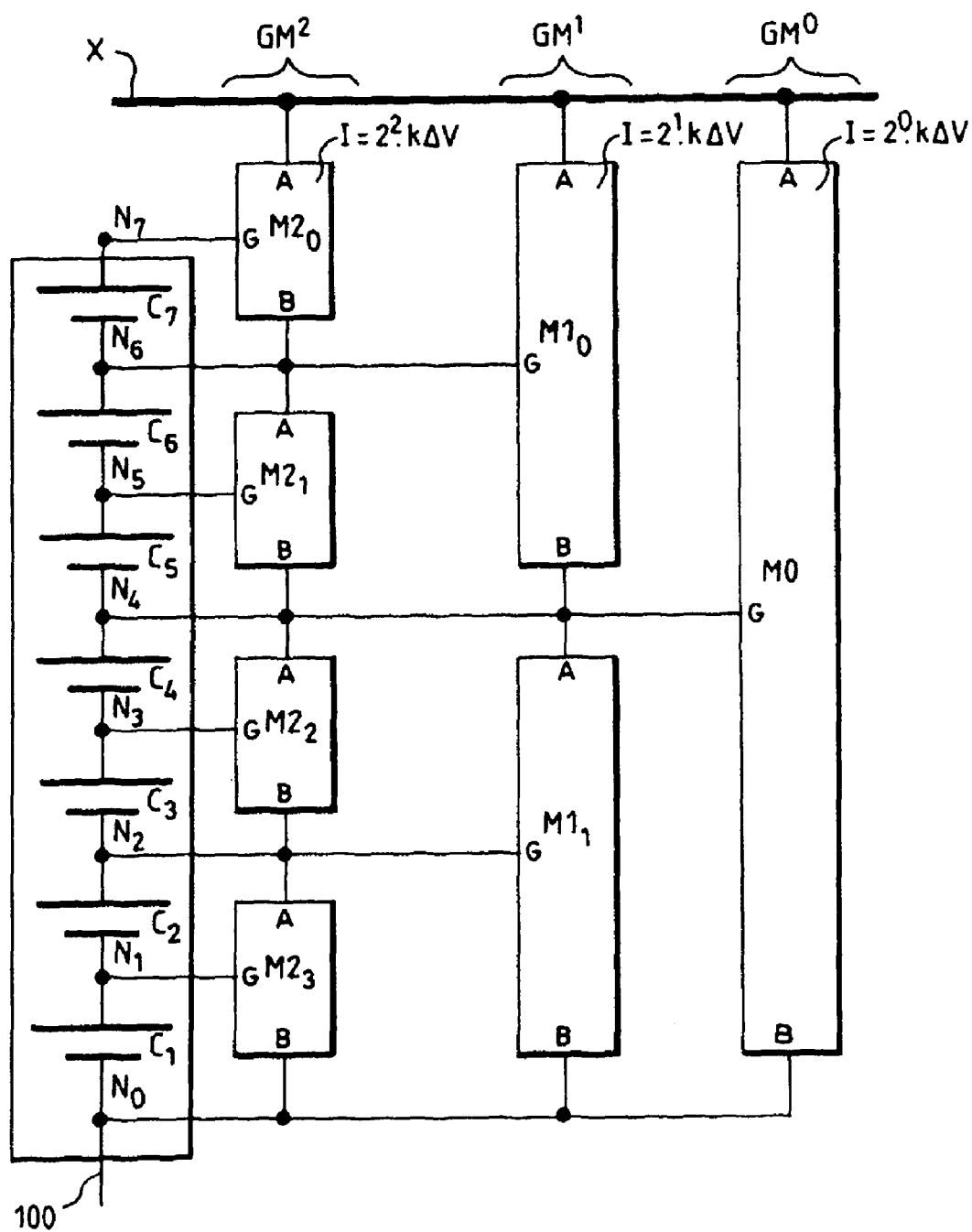

This virtual element does not in reality exist in the structure. The storage device 100 with these n=7 elements $C_1$ to $C_7$ and its equilibrating system is in reality as represented in FIG. 8. The terminals A of the modules $M2_0$, $M1_0$ and $M0_0$ are linked in common by means of a connection line X. The potential VX on this line X is in an undefined state initially. We show that when the equilibrating system is activated, the equilibrating system is such that it establishes the potential VX at a level such that the current which is induced in the virtual element $C_8$ is necessarily zero. It is this that is represented in the arrays of FIGS. 6b and 6c, to be taken in combination with that of FIG. 6a.

We have seen that the array of FIG. 6a illustrates the case of a device with n=8 elements, in which the equilibrating system has been activated on detection of an imbalance, due to an excess of charge on the element $C_5$. The total charge transfer which is established for each cell is given in the column $\Sigma 1$ this array, has already been explained.

But we consider the case where the element $C_8$ is virtual: the current due to the charge transfer caused by the equilibrating system must therefore be zero in this element.

We show that the potential VX on the line X is established automatically at a given value so that this is actually the case. It is as if the system were to behave so that the virtual element likewise induces a charge transfer, such that the sum of the two charge transfers, that due to $C_5$ and that due to the virtual element cancels out for the virtual element. The array of FIG. 6b shows the charge transfer which would be due to the virtual element. The column $\Sigma 2$ gives the total charge transfer which is established for each cell.

The column $\Sigma = \Sigma 1 + \Sigma 2$ in the array of FIG. 6c represents the superposition of the two transfers: we indeed obtain zero transfer on the virtual element. The charge transfer is distributed from the element $C_5$ to the other 6 elements of the storage device 100. The voltage across the terminals of the virtual cell is therefore established at $V_n+\Delta V/7$.

In the example of FIG. 8, the equilibrating system is built on the basis of a single virtual element. In the general case where $n=2^m-x$, with $x \geq 1$, there are x virtual elements.

In the case where x>1, the equilibrating system can be simplified by eliminating from the system any module which would have all its terminals A, B, G linked to virtual elements. We have then I modules with $n-1-x<I\leq n-1$. In this case, the I modules are distributed as m groups of rank 0 to m−1, such that to the group of rank i there corresponds at most $2^i$ modules ($M1_0$, $M1_1$), each associated with $n/2^i$ elements arranged as two assemblies so as to form a pair, the modules of the said group of rank $i \neq 0$ being dimensioned so as to pass $2^i$ times more current than the module M0.

The invention which has just been described is particularly beneficial in respect of all systems where one seeks to improve the performance of the energy storage device at lesser cost.

The invention applies to any equilibrating system using bidirectional and linear charge transfer modules. In particular, the invention is not limited to the example with the modules of the charge pump type given merely by way of illustration.

Throughout the description, the charge transfer module has a linear current transfer characteristic when the voltages of the two cells which are connected to it are close to equilibrium. We speak of linearity to first order. The charge equilibrating system will continue to operate correctly if the gain in current is not linear but it transfers a current of the same sign as the difference in voltage across the cell terminals.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by the definition contained in the appended claims and equivalent thereof.

The invention claimed is:

1. An energy storage device comprising:
   n, wherein n is an integer $\geq 3$, storage elements arranged in a series network; and
   n(n−1)/2 identical charge transfer modules, each module electrically connected to and pairing two storage elements of the n storage elements;
   wherein each module is configured to provide a bidirectional charge transfer between the two storage elements paired therewith;
   wherein each storage element is electrically connected to n−1 modules and is paired with each of the other n−1 storage elements.

2. An energy storage device as claimed in claim 1, wherein said modules are of a three-pole or four-pole type depending on whether the storage elements paired therewith are adjacent or nonadjacent.

3. An energy storage device as claimed in claim 1, wherein each storage element has a pair of terminals and the bidirectional charge transfer between a storage element and the n−1 storage elements paired therewith comprises a charging or discharging current proportional to a first order of the difference between the voltage at the terminals of the element and the average of the voltages at the terminals of the storage elements paired there with.

4. The device as claimed in claim 1, wherein said storage elements are electrochemical battery cells, cells of lithium-ion battery type or supercapacitors.

5. An electronic system comprising a charger and an energy storage device as claimed in claim 1, said energy storage device being rechargeable by the said charger.

* * * * *